United States Patent [19]
Hill et al.

[11] 4,013,976
[45] Mar. 22, 1977

[54] GAS DYNAMIC LASERS

[75] Inventors: Roland John Hill, Quarndon; Norman Thomas Jewell, Mickleover, both of England

[73] Assignee: Rolls-Royce (1971) Limited, London, England

[22] Filed: Jan. 21, 1975

[21] Appl. No.: 542,864

Related U.S. Application Data

[63] Continuation-in-part of Ser. No. 272,842, July 18, 1972, Pat. No. 3,899,749.

[30] Foreign Application Priority Data

July 20, 1971 United Kingdom ............ 33872/71

[52] U.S. Cl. .................... 331/94.5 G; 331/94.5 P; 330/4.3
[51] Int. Cl.² .................... H01S 3/22; H01S 3/095
[58] Field of Search ............ 331/94.5 P, 94.5 PE, 331/94.5 G, 94.5 R; 330/4.3

[56] References Cited

UNITED STATES PATENTS 3,899,749  8/1975  Hill et al. .................. 331/94.5 P

*Primary Examiner*—Robert J. Webser
*Attorney, Agent, or Firm*—Cushman, Darby & Cushman

[57] ABSTRACT

In a high-power laser system it is proposed that combustion or compressor gases be diverted from the normal flow path through a gas turbine engine into an auxiliary flowpath, and that their composition be subsequently adjusted by burning at least one hydrocarbon fuel in them and possibly also by adding other fuels and substances. Suitable aerodynamic expansion of the resultant gases produces a population inversion in the $CO_2$ species, which can be utilized in a laser.

29 Claims, 5 Drawing Figures

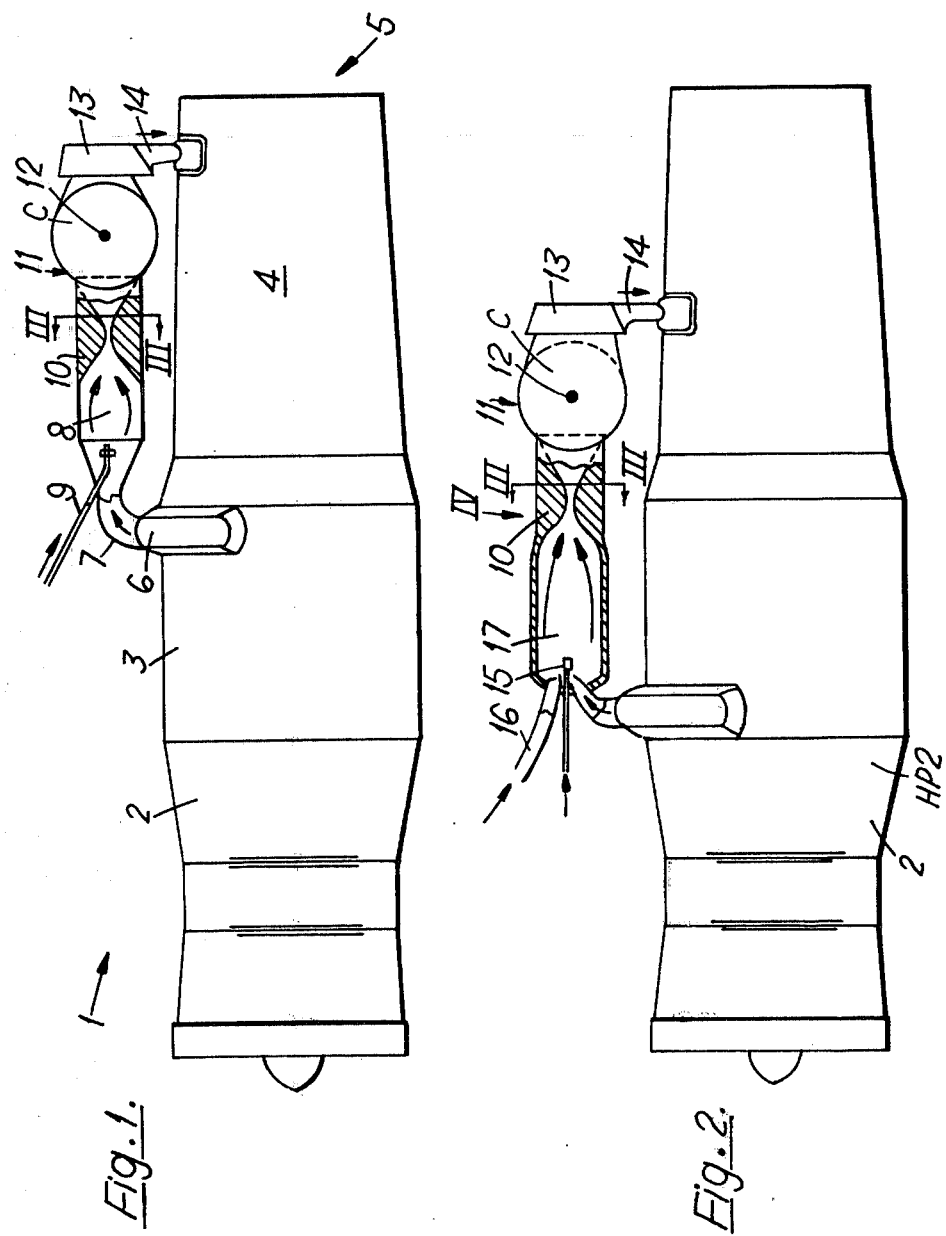

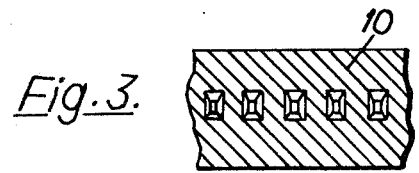
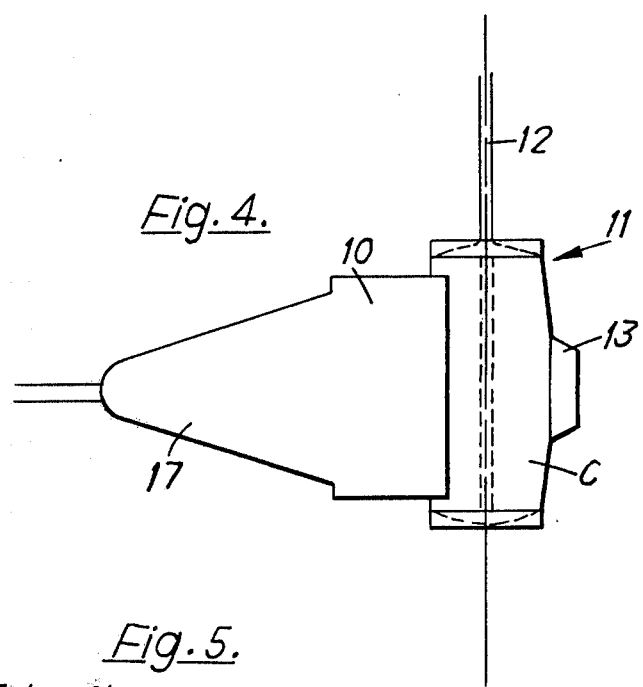
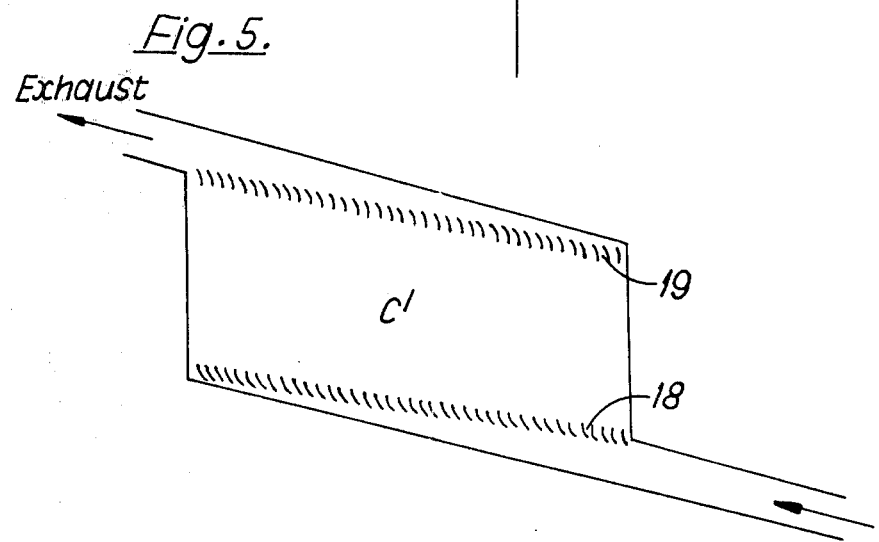

GAS DYNAMIC LASERS

CROSS-REFERENCE TO RELATED APPLICATIONS

This is a continuation-in-part of our earlier application Ser. No. 272,842, filed July 18, 1972, now U.S. Pat. No. 3,899,749.

BACKGROUND OF THE INVENTION

This invention relates to combustion driven gas dynamic lasers. "First Generation" gas dynamic lasers ("GDL's") operated with conditions in the reservoir immediately before the expansion nozzles of 20 atmospheres at some 1200°–1400° K. The gas mixtures of about 90 percent $N_2$, 10 percent $CO_2$ and 1 percent $H_2O$ were commonly obtained by burning CO or $C_2N_2$ with oxygen and nitrogen diluents, with some additions of hydrogen or a hydrocarbon to produce water vapour.

To produce a high laser power it is desirable to operate at higher temperatures and, for compactness, at higher pressures. Also, since cyanogen and carbon monoxide are expensive and toxic fuels, it would be more convenient to use a hydrocarbon fuel, though this implies that the $H_2O/CO_2$ ratio in the lasing gases must be raised from 1:10 to much higher values in the range 0.5:1 to 2:1.

Our computer calculations based on Anderson's method (Published in "Physics and Fluids" vol. 13 number 8, pp. 1983–1989, August 1970; "Time Dependent Analysis of Population Inversion in an Expanding Gas" by J. D. Anderson) predicted that GDL's using hydrocarbon fuels would be feasible, and subsequent experiments have indicated that this is the case.

Mobile vehicle-born GDL's, particularly if they are to be provided on an aircraft, should be as small and light as possible. Even in cases where additional weight can be tolerated, such as ship-born lasers, it is still desirable to keep the installation as compact as possible. It is also desirable that the supply of fuel, oxidant and other necessary inputs to the laser be provided as conveniently as possible in terms of apparatus required, cost of such apparatus, and cost of installation.

DETAILED DESCRIPTION OF THE INVENTION

Accordingly, our invention provides a gas dynamic laser system including in flow sequence
 a continuous combustion engine,
 means for taking gases from said engine,
 means for burning at least one fuel in said engine gases to produce a gaseous mixture for lasing,
 a gas dynamic laser, and
 means for exhausting said gaseous mixture from said laser after passage therethrough;
said continuous combustion engine being a gas turbine engine, said means for taking gases from said engine being adapted to divert said gases from their normal flow path therethrough into an auxiliary flow path including therein said laser, said at least one fuel including at least one hydrocarbon fuel, and said laser including means for aerodynamically expanding said mixture supersonically and an optically resonant cavity for stimulating lasing in said mixture.

In one embodiment of the invention, diverted engine gases are taken from the compressor section of the gas turbine engine.

In another embodiment of the invention, diverted engine gases taken from the gas turbine engine are combustion gases of said engine.

Preferably, the auxiliary flow path includes a reservoir/combustion chamber located upstream of the laser, said chamber having means for introducing the hydrocarbon fuel into the diverted engine gases and burning said hydrocarbon fuel therein.

Besides means for burning the hydrocarbon fuel in the diverted engine gases, the system may also incorporate means for introducing one or more further substances into said engine gases as fuels or additives, said further substances being selected from the group comprising further hydrocarbon fuels, hydrogen, carbon monoxide, carbon disulphide, cyanogen, finely divided carbon, air, nitrogen and carbon dioxide.

Preferably, the gaseous mixture is aerodynamically expanded by a plurality of convergent-divergent supersonic expansion nozzles, which may be in the form of a plurality of spaced-apart aerodynamically shaped vanes. Advantageously, said vanes form a supersonic turning nozzle adapted to both supersonically expand said mixture and also change its direction of flow before its entry into the optically resonant cavity.

After passing through the optically resonant cavity, the gases may be compressed or expanded to the pressure prevailing in the gas turbine exhaust duct and exhausted thereto.

Alternatively, the gases may be exhausted to atmosphere.

The invention also provides a method of powering the gas dynamic laser incorporated in the above system.

In the present invention the lasing species of gas is carbon dioxide.

The carbon dioxide molecule has 3 vibrational degrees of freedom, and a means of using the available thermal energy of the system is to mix the carbon dioxide with an appropriate proportion of a gas such as $N_2$. The $N_2$ has a single vibrational degree of freedom, whose energy levels allow resonant vibrational energy exchange with the upper laser energy level. Furthermore, the relaxation time of homopolar molecules such as $N_2$ are long and result in the $N_2$ acting as an energy pump for the upper laser level in $CO_2$.

Although the two gases just mentioned are necessary to the working of the present invention they are insufficient to produce a high power laser system; small quantities of other substances, called "replacing agents", must be present so as to promote rapid and selective de-excitation of the lower energy levels of the lasing species. Examples of such relaxing agents are water vapour, sulphur dioxide, hydrogen, hydrogen chloride and helium. In larger quantities relaxing agents and other substances such as oxygen or carbon monoxide reduce laser action.

Thus, a gas dynamic laser has to be supplied with gases having constituents whose relative proportions fall within certain limits. When gases diverted from a gas turbine engine are used in a gas dynamic laser, as proposed in the present invention, it is desirable to adjust the composition of the diverted gases so that the relative proportions of the constituents of the gases fed to the laser conform to the requirements for producing maximum laser power. According to the invention, this is achieved by burning a fuel or fuels, including at least one hydrocarbon fuel, in the diverted engine gases.

Embodiments of the present invention will now be described with reference to the accompanying drawings, though it will be realised that the invention is not limited to these embodiments.

In the accompanying drawings (which are not to scale):

FIG. 1 diagrammatically shows a part-sectional view of a first embodiment in which gases are taken from the combustion chamber or chambers of a gas turbine engine, or downstream thereof;

FIG. 2 diagrammatically shows a part-sectional view of a second embodiment in which the gases are taken from the compressor of a gas turbine engine.

FIG. 3 shows a cross section taken on lines III—III in FIGS. 1 and 2.

FIG. 4 shows the position of the optional cavity in relation to the nozzles, and is a view such as might be seen on arrow IV in FIG. 2.

FIG. 5 is a purely schematic representation of one alternative method of arranging the optical cavity in conjunction with expansion and diffusion nozzles.

Referring to FIG. 1, reference numeral 1 indicates a gas turbine engine of the type used to power aircraft, for example, fighter-aircraft. The engine comprises a compressor section 2, combustion equipment 3 and turbine section 4 leading to exhaust duct and nozzle 5. Combustion gases are taken off from the combustion chamber or chambers at 6 and passed by means of a suitable duct 7 to a reservoir/combustion chamber 8, the purpose of which is to smooth out pressure fluctuations and allow mixing and combustion of the engine gases with other substances, such as a fuel, which are injected at 9 or at other points (not shown) into the stream of gases.

The reservoir must obviously be built to withstand the heat of the engine gases. In addition, since non-inert substances are to be injected, as must be the case if engine gas temperature is too low or if the composition of the mixture cannot be adjusted adequately without the addition of such substances, the reservoir must be designed as a combustion chamber. This is in fact the case in the present embodiment.

Typical combustion products of a modern gas turbine engine such as would be used to carry out the present invention are of a composition which is approximately as shown in Table I. The composition which is required for the support of laser action after aerodynamic expansion is also shown, as well as the status of the various constituents as regards the support of laser action in the mixture.

TABLE I

| CONSTITUENT | STATUS | AS TYPICAL MOLAR % OF COMBUSTION GASES OF GAS TURBINE ENGINE | AS MOLAR % OF A MIXTURE REQUIRED TO SUPPORT LASER ACTION |
|---|---|---|---|
| $N_2$ | Energy pump | 76.99 | 70 – 90% |
| $CO_2$ | Lasing species | 2.79 | up to 25% |
| $H_2O$ | Relaxing agents | 2.75 | up to 20% $H_2O$ acceptable* |
| $SO_2$ | | <0.1 | |
| Ar | | 0.9 | |
| CO | Additional gases which could cause additional losses. | <0.1 | Will reduce laser action as percentages increase. |
| $O_2$ | | 16.5 | |

*this figure given subject to the expansion nozzle providing a suitable rate and degree of expansion; the higher the water content, the higher the rate of expansion.

The temperature immediately prior to expansion of the mixture is also important if high laser powers are to be produced by this method. For example, optimum temperature for mixtures conforming to the right hand column of Table I depends on the pressure, composition and nozzle design and may be in the region 1200° to 2400°K, whereas the exit temperature from a gas turbine combustor may be about 1200° to 1600°K.

Although laser action could be produced by feeding a gas dynamic laser of suitable design with unaltered gas turbine engine combustion gases of composition as shown in Table I, column 3, it is nevertheless desirable that some adjustment of the relative proportions of the constituents and/or temperature of the gases be made in order to achieve higher laser power. This alteration is accomplished, according to the present invention, at least partly by burning extra hydrocarbon fuel with the engine combustion products. Other combustible and non-combustible substances could also be injected into the gases to act as fuels, diluents, extra lasing components, or relaxing agents to bring temperature and composition to a desired value.

Examples of fuels and other substances which could be injected into the hydrogen, engine gases are aviation kerosene, various other hydrocarbon fuels, hydrogen, carbon disulphide, carbon monoxide, cyanogen, finely divided carbon, air, nitrogen and carbon dioxide.

Having attained a suitable mixture in reservoir/combustion chamber 8, the gases are passed through convergent-divergent nozzles 10, which are of such proportions as to produce supersonic flow at the throats and in the divergent portions of the nozzles. The nozzles are "choked". Although only one nozzle is shown in FIG. 1 for reasons of simplicity and clarity, there is a multiplicity of nozzles arranged as shown in FIG. 3, which is a cross section of a nozzle arrangement as might be seen on section line III—III in FIGS. 1 and 2.

The nozzles may be of the type commonly known as "slot" nozzles or "2-D" (2-dimensional) nozzles and are arranged in this manner so that a sufficiently long optical path may be provided in optical cavity C.

Alternatively axi-symmetric nozzles may be provided instead of slot nozzles. Axi-symmetric nozzles allow faster rates of expansion, providing that the flow from the array is sufficiently uniform. Such nozzles are subject to high stagnation temperature and pressure and may require cooling, for example by passing coolant liquid or gas through channels within the nozzle array, or by introducing a film of cool gas over the surface of the nozzles.

It may reduce the size of the device if the flow in the subsonic portion of the nozzle is turned so that the outlet flow is at an angle to the inlet. In FIG. 5, not only is the flow turned through an angle in the expansion nozzle portion 18 of the device, but the diffuser portion 19 is similarly designed. The configuration is that of a double supersonic turning nozzle, the lasing cavity C' being interposed between the two sets of nozzles. It will be noticed that this configuration eliminates the flared portion of the reservoir/combustion chamber 8, seen best in FIG. 4, which is otherwise necessary in order to adapt the output of the chamber to the nozzle section 10. Supersonic turning nozzles and their construction are discussed, for example, by Christiansen and Tsongas et al in their respective papers "Pulsed Gas Dynamic Lasers" (AIAA Paper No. 71–572 AIAA 4th Fluid and Plasma Dynamics Conference) and "Studies of Population Inversions Created in Nonequilibrium Flows" (THE TREND IN ENGINEERING, January 1970).

As indicated in FIG. 5, nozzles 18, 19 may be produced by an array of aerodynamically-shaped vanes. Arrays of vanes could also be used in the embodiments according to FIGS. 1 and 2, though in this case they would not be required to perform the function of turning the gases through an angle into and out of the lasing cavity. Such vanes could be internally cooled for operation at high temperatures.

Returning to FIGS. 1 to 4, optical cavity C in expansion chamber 11 provides "resonance", i.e. any laser radiation resulting from the population inversion is reflected backwards and forwards along the optical path by means of suitably shaped mirrors situated at both ends of cavity C, thereby stimulating further laser emission. The optical path is thus disposed transversely of the gas flow through the nozzles and parallel to the row of nozzles, as is shown in FIG. 4, which is a view such as might be seen on arrow IV in FIG. 2.

Assuming that the optical cavity C is correctly constructed, aligned and positioned, a laser beam 12 will result when conditions in the gas stream conform to the requirements as previously stated.

After passing through optical cavity C and expanding to its full extent in expansion chamber 11, its pressure will be of a low value and, unless the gas turbine engine is operating at high altitude, the pressure in chamber 11 will probably be lower than atmospheric pressure or the pressure in the jet pipe 15. Since the exhaust gases must be removed from the apparatus (preferably to the jet pipe in order to augment engine thrust), it is necessary to provide a compressor 13 as well as exhaust duct 14. Thus, if required, compressor 13 may compress exhaust gas to an appropriate value and expel them to atmosphere or to the jet pipe 5 through duct 14, at the same time maintaining a sufficiently low pressure in expansion chamber 11.

Compressor 13 may be powered as an accessory of the gas turbine engine.

Alternatively, a diffuser unit may be used in place of compressor 13 to exhaust the gases from the chamber 11.

Referring now to FIG. 2, this figure shows diagrammatically a further basic embodiment of the invention. Again, a gas turbine engine 1 as already described is used to supply gases, but in this version they are taken from the high pressure compressor H.P. 2 of the compressor 2 of the engine. In order to produce a gas stream of the required temperature, pressure and composition, it is necessary to burn a fuel in the diverted gases at 15, and possibly inject or burn other substances at 16 in addition.

Suitable fuels would be, for example, benzene, kerosene, acetylene, or ethylene i.e. hydrocarbon fuels generally. Reactive additives could be cyanogen, carbon disulphide or carbon monoxide, for example, which would also be classed as fuels. A non-reactive additive could be nitrogen or $CO_2$.

After combustion and mixing in reservoir/combustion chamber 17, the mixture is passed successively to nozzles 10 and expansion chamber 11 containing optical cavity C where laser beam 12 is produced. The gases are then exhausted to atmosphere or to jet pipe 5 through compressor 13 (or a diffuser) and duct 14. Thus, the part of the present embodiment downstream of the reservoir/combustion chamber 17 is substantially the same as that of the first embodiment already described, and may also incorporate variations in nozzle and chamber design similar to those described in relation to the first embodiment, for example, the supersonic turning nozzle arrangement depicted in FIG. 5.

It is technically convenient, from the point of view of simplicity of operation and installation of a gas dynamic laser which uses gases diverted from a gas turbine engine, to burn a liquid hydrocarbon fuel in the diverted gases in order to produce a gaseous mixture of good lasing characteristics. It is particularly convenient if the hydrocarbon fuel used is the same as that which is burnt in the gas turbine engine — in the case of an aviation gas turbine engine, that would be aviation kerosene.

It was thought in the early days of investigations into the feasibility of gas dynamic lasers that some hydrocarbon fuels when burnt would not provide suitable mixtures of gases for lasing. However, it has now been found that fuels originally thought of as less likely candidates for producing lasing mixtures, such as kerosene and methane, have increased usefulness when the aerodynamic expansion is tailored to their requirements. In general, the larger the $H_2O/CO_2$ ratio in the gaseous mixture, the higher the rate of expansion and degree of expansion needed to produce lasing.

A GDL based on the combustion of hydrocarbon fuels, whose combustion products with oxygen have ratios of $H_2O/CO_2$ of between 0.5 to 2, has been modelled theoretically by the present inventors and the population inversion in and downstream of the nozzles calculated using a non-equilibrium computer programme of the Anderson type. It is found that acceptable small signal gains are predicted for nozzles contoured to produce the fastest shock-free expansion, if the area ratio of the nozzle is increased to about 50:1 and the throat height is made sufficiently small.

"Small signal gain" is a measure of the amplification per unit length of a beam of radiation at the laser output wavelength which does not appreciably disturb the lasing medium.

Although, with these $H_2O/CO_2$ ratios, the gain falls off quite rapidly downstream of the nozzle, the values predicted still allow a laser cavity of sufficient length to extract most of the available power.

Experiments using a small GDL have been carried out to verify these calculations, and some results of the experiments are given later. Small signal gain was measured with a probe laser on the "P20" transition of the $CO_2$ molecules with three tri-glycine sulphide pyroelectric detectors in a phase sensitive circuit measuring the gain downstream of the nozzles. A resonator covering part of the gas flow gave indications of power.

A potential lasing mixture in the context of the present specification may be defined as any mixture for which it is possible to produce theoretical or experimental evidence to show that the mixture has a positive value of small signal gain (say, gain $0.1 \geq$ percent/cm). Thus, Meinzer, in his paper "Experimental G.D.L. Investigation" (AIAA Paper Number 71–25 presented at the AIAA 9th Aerospace Sciences Meeting, New York, N.Y., January 25–27, 1971) observed signal gain in mixtures in which the molar percentages of individual constituents ranged as follows:

$H_2O$ : 0–30 percent
$CO_2$ : 5–50 percent
$N_2$ : 42–88 percent

The optimum gain mixture was approximately 3 percent $H_2O$, 27 percent $CO_2$ and 70 percent $N_2$.

The range of mixtures for which Meinzer obtained gain included mixtures which can be formed from hydrocarbons such as methane ($CH_4$), ethylene ($C_2H_4$), kerosene ($C_{12}H_{24}$), acetylene ($C_2H_2$) and benzene ($C_6H_6$), burned in conjunction with oxygen and nitrogen. The results illustrated that laser potential (gain $\geq$ 0.1 percent/cm) was present when the $H_2O/CO_2$ ratio ranged from 4/1 to < 1/20. For example, when methane or benzene are burnt stoichiometrically, the $H_2O/CO_2$ ratios in the combustion gases are 2/1 and ½ respectively. Thus, both fuels are potentially useful for gas dynamic lasers.

It is, or course, essential that there be some water vapour present in any mixture of $CO_2$ and $N_2$ in which it is desired to induce lasing, since as mentioned before, water acts as a relaxing agent for the lower energy levels of the $CO_2$. In cases where fuels having high carbon-content to hydrogen-content ratio (C/H ratio) are used, the water vapour produced by the combustion reaction may be insufficient to promote lasing. In that case, the deficiency may be made up by adding appropriate amounts of a low C/H ratio fuel during combustion. One convenient method of adding low C/H ratio fuels during combustion of high C/H ratio fuels is to feed a pilot-light with one of the former, such as methane. This helps in ignition of the main fuel.

In some circumstances it may be desirable to use a fuel having zero hydrogen content, such as carbon monoxide. It is apparent that water vapour could be supplied to the combustion products by again adding a low C/H ratio hydrocarbon fuel or, of course, hydrogen during combustion.

These considerations again illustrate that, using either compressor gases or combustion gases diverted from a gas turbine, the task of using these gases in a gas dynamic laser involves adjusting their composition such that they will support lasing at high powers, either by burning one or more suitable fuels in them or by injecting other desired substances into them, or both.

As mentioned before, the most convenient way of suitably changing the composition of the gases is to burn liquid hydrocarbon fuels in them. The pre-combustion composition of a combustible mixture of air and fuel can be conveniently expressed by reference to its "equivalence ratio". The equivalence ratio is defined as $$\frac{\text{fuel to air ratio of mixture}}{\text{fuel to air ratio of stoichiometric mixture}}$$

Applying this to the concept of using gases from a gas turbine engine, we find that the normal equivalence ratio of the combustion chamber mixture is approximately 0.15–0.3, whilst of course it is zero in the case of compressor gases. Burning fuel in the compressor gases — or extra fuel in the combustion gases — to produce gas mixtures suitable for lasing has the same effect as raising the equivalence ratios of the original gas mixtures.

Computed examples of laser action possible from the expansion of products of kerosene-air and benzene-air combustion at equivalence ratios in the general range 0.4–0.8 are given in Tables II and III respectively. As inferred above, it is necessary that these equivalence ratios are in general higher than is usual in the combustion chamber of a normal gas turbine engine, and they thus assume the burning of an appropriate (easily calculated) amount of fuel in the gases diverted from the gas turbine engine, even in the case where the diverted gases are from the combustion chamber of the engine.

TABLE II

| KEROSENE-AIR | | | |
|---|---|---|---|
| Equivalence ratio | 0.38 | 0.59 | 0.85 |
| Reservoir Pressure (Atmospheres) | 16 | 16 | 16 |
| Stagnation (TOTAL) Temperature (° K) | 1600 | 2000 | 2400 |
| Molar % $N_2$ | 76 | 75 | 73 |
| $CO_2$ | 5 | 8.1 | 11 |
| $H_2O$ | 5 | 7.7 | 11 |
| $O_2$ | 12 | 7.9 | 2.5 |
| Small signal gain (% cm) | 0.78 | 1.03 | 0.83 |
| Area expansion ratio for minimum length contoured 2D nozzle, throat height 0.2 mm | 55 | 55 | 55 |
| Ideal power KW/Kg of flow (without losses) | 33 | 44 | 48 |

TABLE III

| BENZENE-AIR | | | |
|---|---|---|---|
| Equivalence ratio | 0.36 | 0.56 | 0.78 |
| Reservoir Pressure (Atmospheres) | 16 | 16 | 16 |
| Stagnation (Total) Temperature (° K) | 1600 | 2000 | 2400 |
| Molar% $N_2$ | 77.70 | 77.20 | 76.83 |
| $CO_2$ | 6.03 | 9.24 | 12.71 |
| $H_2O$ | 2.99 | 4.58 | 6.33 |
| $O_2$ | 13.28 | 8.98 | 4.13 |
| Small signal gain (%/cm) | .90 | 1.07 | .82 |
| Area expansion ratio for minimum length contoured 2D nozzle, throat | | | |

TABLE III-continued

| | BENZENE-AIR | | |
|---|---|---|---|
| height 0.2 mm | 55 | 55 | 55 |
| Ideal power KW/Kg of flow (without losses) | 33 | 49 | 57 |

In Tables II and III, ethylene and acetylene respectively could be used as gaseous fuels instead of kerosene and benzene, which are liquids. They would provide the same ratios of $H_2O:CO_2$, but for the same composition of combustion gases the temperatures would be slightly higher.

It will be appreciated that a larger range of conditions than shown in Tables II and III is possible and that the exact conditions of pressure and temperature chosen will depend on engineering considerations such as the availability of engine gases and the maximum temperature that the nozzles will bear. In each case the nozzle is optimised for maximum gain and power. The data in Tables II and III are given for certain compositions of the lasing mixtures, and hence are equally applicable to both the case in which the engine gases are combustion gases and the case in which they are compressor gases. Obviously, in order to attain these compositions, varying proportions of fuel must be burnt with the diverted engine gases according to a. whether the engine gases are compressor or combustion gases
b. the type of fuel (kerosene or benzene).

Further it is assumed in Tables II and III that the quoted equivalence ratios are attained entirely as a result of the burning of a certain quantity of a hydrocarbon fuel in a certain quantity of air. However, our invention envisages the possibility of the addition of substances other than hydrocarbon fuels to the engine gases, in which case the desired composition could be achieved by using different relative proportions of engine gases and hydrocarbon fuels than would otherwise be the case.

In order to illustrate the above statements, Table IV shows how mixtures of various proportions of fuels, engine compressor air and additives may be obtained whose combustion products will support lasing. The total mass flow of all components of the mixture is taken as unity.

TABLE IV

| Proportional mass-flow of Air from Compressor (Kg/Sec) | Proportional mass-flow of fuel and additives (Kg/Sec) |
|---|---|
| 0.963 | 0.037 Kerosene (burnt at equivalence ratio of 0.6) No additives |
| 0.396 | 0.028 ($C_6H_6$) Benzene (burnt at equivalence ratio > 0.6) |
| | 0.49 $N_2$ ⎫ Additives |
| | 0.09 $CO_2$ ⎭ |

In the second example in Table IV, benzene is burned at an equivalence ratio of greater than 0.6. However, the addition of the nitrogen and carbon dioxide achieves the same effect as burning the benzene at a lower equivalence ratio with no additives.

The range of mixtures over which it is possible to achieve lasing is an important aspect of research, since the ease with which the present invention may be performed depends to some extend on how much the composition of a combustion mixture may in practice depart from the ideal without degrading laser power so much that the laser beam produced is too weak to be of use.

In experiments burning ethylene, $C_2H_4$, as fuel in a mixture of gases comprising compressed nitrogen and oxygen approximately in the same proportions as found in air, appreciable signal gain ($\geq$ 0.5 percent cm) was observed in the combustion products over a range of equivalence ratios. Representative results are given in the following Table V.

TABLE V

| Equivalence ratio | | 0.67 | 0.58 | 0.49 |
|---|---|---|---|---|
| Pressure (Atmospheres) | | 23 | 22 | 20.5 |
| Stagnation (Total) Temperature (° K) | | 1910 | 1740 | 1580 |
| Molar % | $N_2$ | 75 | 76.6 | 77.7 |
| | $CO_2$ | 9 | 7.5 | 6.3 |
| | $H_2O$ | 9 | 7.5 | 6.3 |
| | $O_2$ | 7 | 8.4 | 9.7 |

In similar experiments, it was found that even in cases where the oxygen content of the combustion gases was caused to reach about 12 percent by burning the fuel with a greater excess of oxygen, signal gains were still observed. These results illustrate that even if the hydrocarbon fuel is burnt with excess oxygen, as would probably be the case in the embodiment of our invention utilising gas turbine engine compressor gases, useful laser action is attainable.

In the experiments shown in Table V, the composition of the combustion mixture was arranged so that the $H_2O:CO_2$ ratio was 1:1. In order to confirm Meinzer's findings (already referred to) concerning the range of $H_2O:CO_2$ ratios over which laser potential can be demonstrated, further tests using ethylene as fuel were arranged, and positive small signal gains were observed in various mixtures, representative results of which are shown in Table VI.

TABLE VI

| Pressure (Atmospheres) | | 21 | 21.6 | 21 |
|---|---|---|---|---|
| Stagnation (Total) Temperature (° K) | | 1470 | 1560 | 1570 |
| Molar % | $N_2$ | 80 | 78.6 | 79 |
| | $CO_2$ | 18.4 | 14.7 | 10.7 |
| | $H_2O$ | 1.6 | 5.2 | 8.6 |
| | $O_2$ | 0 | 1.5 | 1.7 |

These results confirm laser potential in mixtures in which the $H_2O:CO_2$ ratio ranges from 1:1 to or less 1:11.5.

At this point it is again emphasized that whilst the above mixtures were obtained by burning ethylene, it is of course possible to get very similar mixtures by burning other hydrocarbon fuels under suitable conditions. This follows from the fact that is the C:H ratio in the fuel which determines the $H_2O:CO_2$ ratio in the combustion gases (assuming that no other substances are injected into the mixture which could affect the latter ratio).

In determining which mixtures of gaseous combustion products will support high-power lasing (and hence which ingredients in what relative proportions must be injected into and/or burnt in the gases diverted from a gas turbine engine), it must be borne in mind that even if a mixture contains a substance which acts as a "poison" or inhibitor to laser action, this need not matter significantly provided the inhibitor is in sufficiently small proportion to the lasing, pumping and relaxation promoting ingredients.

In order to emphasise the wide range of possible hydrocarbon fuels useable in apparatus according to the present invention, Table VII shows some fuels and their stoichiometric combustion products.

TABLE VII

PRODUCTS FROM STOICHIOMETRIC COMBUSTION WITH AIR OF VARIOUS HYDROCARBONS

| Fuel | | % $N_2$ | % $CO_2$ | % $H_2O$ |
|---|---|---|---|---|
| Methane | $CH_4$ | 72.7 | 9.1 | 18.2 |
| Ethane | $C_2H_6$ | 73.7 | 10.5 | 15.8 |
| Propane | $C_3H_8$ | 74.1 | 11.1 | 14.8 |
| Butane | $C_4H_{10}$ | 74.3 | 11.4 | 14.3 |
| Pentane | $C_5H_{12}$ | 74.4 | 11.7 | 13.9 |
| Octane | $C_8H_{18}$ | 74.6 | 11.9 | 13.5 |
| Ethylene | $C_2H_4$ | | | |
| Propylene | $C_3H_6$ | 75.0 | 12.5 | 12.5 |
| Kerosene | $C_{12}H_{24}$ | | | |
| Xylene | $C_8H_{10}$ | 76.4 | 14.5 | 9.1 |
| Toluene | $C_7H_8$ | 76.6 | 14.9 | 8.5 |
| Acetylene | $C_2H_2$ | 76.8 | 15.3 | 7.7 |
| Benzene | $C_6H_6$ | | | |
| Napthalene | $C_{10}H_8$ | 77.4 | 16.2 | 6.4 |

Whilst some fuels would be more practical to use than others from the points of view of handling, storage, ignition temperature, combustion temperature, combustion products, ease of attaining complete combustion, attainability of near-stoichiometric combustion, etc., it is apparent from Table VII that no hydrocarbon fuel can be absolutely excluded from consideration as capable of fueling a combustion-driven gas dynamic laser device according to the invention; any hydrocarbon can be used as a main fuel or fuel additive if the resultant final products of combustion for $CO_2$, $H_2O$, and $O_2$ fall within the range shown to produce small signal gain.

Using apparatus similar to that described in the present specification, it is thought possible to produce a laser beam of sufficient power to be useful in an offensive of defensive role.

Considering the embodiment of the present invention in which the compressor gases are diverted, modern gas turbine engine compressors are capable of delivering mass flows of the order of 100 Kg/sec. of which 10 percent may easily be diverted. Of the total energy contained in the diverted gases, about 40 KW/Kg/Sec may be potentially available for laser action using carbon dioxide as the lasing species. If, in such a device, one quarter to one half of the potential laser power is realised, then 10 to 20 KW/Kg/Sec will be obtained; for the example given above this is a total of 100 to 200 KW.

We claim:

1. A method of operating a combustion powered air-breathing gas dynamic laser of the carbon dioxide type by taking gases from a continuous combustion engine, burning in said engine gases at least one fuel to produce a gaseous mixture for lasing, and passing said gaseous mixture through said laser; said continuous combustion engine being a gas turbine engine, said gases taken from said engine being diverted from the normal flow path therethrough into an auxiliary flow path including therein said laser, said at least one fuel including at least one hydrocarbon fuel whereby the gaseous $H_2O:CO_2$ ratio in the combustion gases is caused to be in the range between 2:1 and 1:11.5, and said gaseous mixture being lased by aerodynamically expanding said mixture supersonically and passing it through an optically resonant cavity.

2. A method according to claim 1 in which the diverted engine gases are taken from the compressor section of the gas turbine engine.

3. A method according to claim 1 in which the diverted engine gases are combustion gases from the gas turbine engine.

4. A method according to claim 2 in which the engine gases are passed to a reservoir/combustion chamber wherein the hydrocarbon fuel is burnt.

5. A method according to claim 4 in which one or more further substances are introduced into the reservoir/combustion chamber, said further substances being selected from the group comprising further hydrocarbon fuels, hydrogen, carbon monoxide, carbon disulphide, cyanogen, nitrogen and carbon dioxide.

6. A method according to claim 3 in which the diverted engine gases are passed for further combustion to a reservoir/combustion chamber wherein the hydrocarbon fuel is burnt.

7. A method according to claim 6 in which one or more further substances are introduced into the reservoir/combustion chamber, said further substances being selected from the group comprising further hydrocarbon fuels, hydrogen, carbon monoxide, carbon disulphide, cyanogen, finely divided carbon, air, nitrogen and carbon dioxide.

8. A method according to claim 1 in which, besides the hydrocarbon fuel, one or more further substances are introduced into the diverted engine gases, said further substances being selected from the group comprising further hydrocarbon fuels, hydrogen, carbon monoxide, carbon disulphide, cyanogen, finely divided carbon, air, nitrogen and carbon dioxide.

9. A method according to claim 1 in which, after passing through the optically resonant cavity, the gases are exhausted to the gas turbine engine exhaust duct.

10. A method according to claim 1 in which, after passing through the optically resonant cavity, the gases are exhausted to atmosphere.

11. A combustion powered air breathing gas dynamic laser system of the carbon dioxide type including in flow sequence a continuous combustion engine, means for taking gases from said engine, means for burning at least one fuel in said engine gases to produce a gaseous mixture for lasing, a gas dynamic laser, and means for exhausting said gaseous mixture from said laser after passage therethrough; said continuous combustion engine being a gas turbine engine, said means for taking gases from said engine being adapted to divert said gases from their normal flow path therethrough into an auxiliary flow path including therein said laser, said at least one fuel including at least one hydrocarbon fuel whereby the gaseous $H_2O:CO_2$ ratio in the combustion gases is caused to be in the range between 2:1 and 1:11.5, and said laser including means for aerodynamically expanding said mixture supersonically and an optically resonant cavity for stimulating lasing in said mixture.

12. A system according to claim 11 in which the diverted engine gases are taken from the compressor section of the gas turbine engine.

13. A system according to claim 11 in which the diverted engine gases taken from the gas turbine engine are combustion gases of said engine.

14. A system according to claim 12 in which the auxiliary flow path includes a reservoir/combustion chamber located upstream of the laser, said chamber having means for introducing the hydrocarbon fuel into the diverted engine gases and burning said hydrocarbon fuel therein.

15. A system according to claim 14 having means through which one or more further substances are introduced into the combustion chamber, said further substances being selected from the group comprising further hydrocarbon fuels, hydrogen, carbon monoxide, carbon disulphide, cyanogen, nitrogen and carbon dioxide.

16. A system according to claim 13 in which the auxiliary flow path includes a reservoir/combustion chamber located upstream of the laser, said chamber having means for introducing the hydrocarbon fuel into the diverted engine gases and burning said hydrocarbon fuel therein.

17. A system according to claim 16 having means through which one or more further substances are introduced into the reservoir/combustion chamber, said further substances being selected from the group comprising further hydrocarbon fuels, hydrogen, carbon monoxide, carbon disulphide, cyanogen, finely divided carbon, air, nitrogen and carbon dioxide.

18. A system according to claim 11 having, besides means for burning the hydrocarbon fuel in the engine gases, means for introducing one or more further substances into said engine gases, said further substances being selected from the group comprising further hydrocarbon fuels, hydrogen, carbon monoxide, carbon disulphide, cyanogen, finely divided carbon, air, nitrogen and carbon dioxide.

19. A system according to claim 11 in which means for aerodynamically expanding the gaseous mixture comprise a plurality of convergent-divergent supersonic expansion nozzles.

20. A system according to claim 19 in which the expansion nozzles comprise a plurality of spaced-apart aerodynamically shaped vanes.

21. A system according to claim 11 in which means for aerodynamically expanding the gaseous mixture comprises at least one row of aerodynamically shaped vanes forming a supersonic turning nozzle adapted to both supersonically expand the gaseous mixture and change its direction of flow before its entry into the optically resonant cavity.

22. A system according to claim 11 in which the means whereby the gaseous mixture is exhausted from the laser comprises at least compressor means operable to remove said mixture from the optically resonant cavity and pass it to the exhaust duct of the gas turbine engine.

23. A system according to claim 11 in which the means whereby the gaseous mixture is exhausted from the laser comprises at least compressor means operable to remove said mixture from the optically resonant cavity and pass it to atmosphere.

24. A system according to claim 11 in which the means whereby the gaseous mixture is exhausted from the laser comprises a diffuser adapted to pass gases to the exhaust duct of the gas turbine.

25. A system according to claim 11 in which the means whereby the gaseous mixture is exhausted from the laser comprises a diffuser adapted to pass gases to atmosphere.

26. The method of claim 1 wherein the ratio of $H_2O$ to $CO_2$ is in the range of between 2:1 and 1:2.

27. The system of claim 11 wherein the ratio of $H_2O$ to $CO_2$ is in the range of between 2:1 and 1:2.

28. The system of claim 11 wherein said means for aerodynamically expanding said mixture supersonically comprises a plurality of supersonic expansion nozzles having an area ratio of at least 50:1.

29. The system of claim 19 wherein the area ratio of said supersonic expansion nozzles is at least 50:1.

* * * * *